United States Patent Office 2,765,297
Patented Oct. 2, 1956

2,765,297

POLYMERIZATION OF ETHYLENE WITH PROMOTED CATALYSTS

Randall G. Heiligmann and Palmer B. Stickney, Columbus, Ohio, assignors, by mesne assignments, to The Borden Company, New York, N. Y., a corporation of New Jersey No Drawing. Application May 21, 1952,
Serial No. 289,199

5 Claims. (Cl. 260—94.9)

The invention here presented is a new catalytic process for the polymerization of olefinic type materials in general, which is particularly applicable to ethylene, in which the polymerization is obtained by the use of two catalyst components, neither of which are efficient catalysts alone, but which together produce a powerful and potent catalytic effect, the catalytic power of one component being induced by the second component.

Many of the olefinic materials have been polymerized by many different catalysts, and some polymerize much more easily than others. Ethylene in particular has been found to be less readily polymerizable than many other monomers. In the past it has been found possible to polymerize ethylene by the use of various catalysts containing directly linked oxygen atoms such as molecular oxygen, benzoyl peroxide, potassium persulfate, diethyl peroxydicarbonate, and various similar compounds. None of these catalysts are, however, entirely satisfactory since in some cases excessive pressures are required, and oxygen-linked portions of the catalyst remain combined in the resulting polymer. These fragments may show up as impurities which lead to undesirable properties in the polymer and tend strongly towards depolymerization of the finished product. Also, various of the organic oxygen compounds are unstable, poisonous, and dangerous to handle and store. Others of the catalysts decompose into gaseous products which may adversely affect the ultimate polymer. In addition, many of these catalysts will operate only over rather narrow, restricted, temperature ranges. While many free radical producing compounds have been found to be effective catalysts for the polymerization of the more reactive unsaturated organic compounds such as styrene, methyl-methacrylate, and the like, only a very small number of these produce radicals sufficiently reactive to cause extensive polymerization of a refractory monomer such as ethylene.

According to the present invention, it is found that a new and novel two-component catalyst system can be obtained which is easy to handle, operable over a wide range of temperatures and pressures, which yields no oxygenated residues, forms no gases, and yields a polymer having outstandingly good physical properties.

In this catalyst system, there is provide, first, an organic compound containing a readily extractable hydrogen atom and a second compound capable of reacting with the first to form a free radical, which when formed shows a very high catalytic activity. Other objects and details of the invention will be apparent from the following description.

In practicing the invention, there is prepared a compound catalyst which is then combined with the ethylenic material under suitable pressure and at suitable temperature to obtain the desired polymerization reaction.

The catalyst member of the combination consists of at least two components. Component A preferably is a substance containing a readily extractable hydrogen atom. This is primarily a tertiary hydrogen atom, the adjacent radicals being such as to facilitate the removal of this hydrogen atom to yield a free radical. Representative substances are the substituted aliphatic compounds, such as the esters, ethers, nitriles, and ketones. Alternatively, however, the mere fact of adjacent hydrocarbon substituents on radicals is sufficient to facilitate the removal of the hydrogen. The preferred structure is a substituted methane containing at least one hydrogen, two hydrocarbon substituents the composition of which is of relatively minor importance, and a polar group. The two hydrocarbon substituents may be hydrogen or aliphatic or aromatic groups of almost any size or character. The polar member, however, preferably consists of a group such as —CN, —COOH, —COOR$_3$, —OOCR$_3$, or

R$_3$ representing an alkyl or aryl group. Also, there may be present two such polar groups and a single hydrocarbon substituent. The substituted methane is of the following type formula

in which X is a polar component selected from the group consisting of —CN, —COOH, —COOR$_3$, —OOCR$_3$, and

R$_1$ and R$_3$ represent the same or a different monovalent hydrocarbon radical containing not more than 6 carbon atoms, R$_1$ being ordinarily a C$_1$–C$_2$ alkyl, and R$_2$ represents a component selected from the group consisting of hydrogen, R$_1$, and X. Preferred compounds are exemplified by isopropyl isobutyrate, ethyl malononitrile, isobutyronitrile, and isobutyl benzoate.

The second substance, component B, may be any compound or material capable of reacting with component A to form free radicals by extraction or removal of the hydrogen from the methanic carbon. Component B may, if desired, be a substance which yields a free radical, or it may be a substance containing easily removable oxygen which will extract the hydrogen from component A. Materials suitable for component B include peroxides, such as benzoyl peroxide, lauroyl peroxide, cumene hydroperoxide, and t-butyl hydroperoxide; tetraalkyl lead compounds, and titanium dioxide. These compounds are relatively inefficient catalysts for refractory monomers such as ethylene, when used alone. However, when combined with a material selected from those representative of component A, the resulting system becomes an active catalyst for ethylene polymerization. Furthermore, the present catalyst system is operable over a much wider temperature range than conventional free radical producing catalysts, this being governed by proper selection of the two components.

The polymerizable substance upon which the catalyst system operates may be ethylene alone, in which case an excellent grade of polyethylene is obtained. Alternatively, other ethylenic monomers such as propylene, the normal butenes (as well as isobutylene, which however is preferably polymerized by other catalysts), the pentenes, and the like may also be polymerized by the present catalyst. Thus, a wide range of ethylenic mixtures may be copolymerized by the catalyst of the present invention. Thus, mixtures of ethylene with propylene, butylene, pentene, and the like are readily polymerized although the polymer does not as a rule contain the respective components in the same proportion in which they are mixed as gases. Many other unsaturates such as styrene, butadiene, vinyl acetate, vinyl chloride, methyl methacrylate, vinylidene chloride, carbon monoxide, vinyl pyridine, and the like may also be copolymerized with ethylene by induced catalysis.

Since most of the polymerization reactions preferably occur at elevated pressures and controlled temperatures, the preferred procedure is to compress the polymerizable gas to an appropriate pressure in a suitable pressure cylinder to which the catalyst has previously been added, together with any liquid copolymerizates which may be desired. The pressure cylinder is preferably heated to a controlled temperature determined in part by the catalyst system and in part by the characteristics of the polymerizable materials. The polymerization usually occurs at a relatively slow rate, and occurs only so long as the pressure is maintained above a critical value. Accordingly, for efficient operations, additional compressed gas and additional catalyst may be introduced into the reactor until the desired amount of polymer is obtained.

Thus, in utilizing the process of this invention, the several components of the selected catalyst system are introduced into a suitable reactor along with a charge of ethylene or a mixture of ethylene and one or more other polymerizable compounds. The reaction proceeds most satisfactorily with the ethylene under a pressure of 1000 p. s. i. or higher, up to 20,000 or 30,000 or even as high as 50,000 p. s. i. Preferred pressures are in the range of 4000 p. s. i. or higher up to 20,000 p. s. i. The temperature required for a satisfactory reaction can be controlled over a considerable range by proper selection of the components of the catalyst system. Systems can be designed which are operable from about 50° C. to about 250° F. For many purposes, it is desirable to carry out the polymerization in the temperature range, 100° C. to 175° C. Polymers prepared in this range generally have a desirable combination of mechanical properties for many applications. Numerous inductive systems of the type characteristic of this invention can be designed which operate efficiently in this desired temperature range. The useful temperature range of such systems depends both on the A and B components selected. For example, the system comprising isobutyronitrile as component A and cumene hydroperoxide as component B has its maximum activity at about 125° C. If ethyl malononitrile is substituted for isobutyronitrile the optimum activity is obtained at about 150° C. If t-butyl hydroperoxide is used as component B with ethyl malononitrile, however, the optimum activity is reached between 100° C. and 125° C.

While the reaction mechanism of these catalyst systems is not fully understood, it is believed that, under reaction conditions, component B produces free radicals which abstract hydrogen atoms from component A, thus producing more active free radicals from the latter which, in turn, are sufficiently active to initiate extensive ethylene polymerization. Where component A is isobutyronitrile and component B is cumene hydroperoxide, the reaction may proceed as follows:

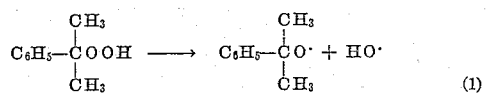

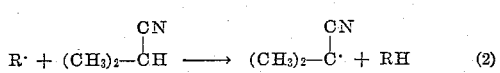

where R· in Reaction 2 may be either of the radicals formed in Reaction 1.

The preferred examples of component A cited above are especially effective in inductive catalysis because they contain readily extractable hydrogen atoms. In addition, the radicals obtained, having the structure:

where X is a polar unsaturated group conjugated with the free valence of the radical, appear to be particularly efficient in initiating the polymerization of refractory monomers such as ethylene. Such a catalyst system is capable of producing these highly reactive radicals from relatively simple, inexpensive, and stable components. Moreover, it is possible to produce in this way radicals which cannot be readily obtained from known peroxide, azo, or other conventional catalysts. For example, the use of an alkylmalononitrile as component A produces the highly reactive radical:

which is quite efficient as a polymerization initiator.

In inductive catalysis, radicals highly reactive toward ethylene are formed through the reaction of relatively ineffective radical producing compounds (component B) with compounds containing active hydrogen atoms (component A). In general, it has been found that a properly designed inductive catalysis system is far more effective than a catalyst comprising either of the components alone. In fact, compounds representative of component A generally do not function as catalysts for the polymerization of unsaturated organic compounds. Materials representing component B may exhibit activity as polymerization initiators for ethylene. However, where any considerable initiator activity toward ethylene is associated with component B, per se, its use is limited in practice by factors such as instability, formation of undesirable oxygen-bearing radicals, and limited operating range relative to temperature and pressure.

The above discussion is offered as a tentative explanation of a possible reaction. It has, however, been impossible to the present to obtain conclusive proof of the accuracy of this suggested reaction or mechanism, and accordingly it is not relied upon for the inventive material nor is it intended to limit the scope of the invention in any way.

The presently preferred method of practicing the invention is shown in the following examples, which, however, are also intended to be representative or indicative only and not as limiting the scope of the invention.

*Example 1*

Stainless steel pressure reactors containing the indicated "catalysts" were chilled to Dry Ice temperature and flushed with ethylene. They were then charged with sufficient ethylene to give 5000 p. s. i. pressure at 125° C. The charged reactors were warmed to this temperature and held there for 16 hours. At the end of this time the residual ethylene was vented and the reactors opened. The polyethylene was readily recovered as a white amorphous solid. The catalysts used, polymer yields, and softening points are given in the following table:

| Catalyst | | | | Polymer Yield, Parts per 100 of Monomer | Polymer Softening Point, ° C. |
| --- | --- | --- | --- | --- | --- |
| Component A | Parts | Component B | Parts | | |
| IBN [1] | 0.5 | None | | None | |
| None | | CHP [2] | 0.5 | 3.6 | 91 |
| IBN [1] | 0.5 | CHP [2] | 0.5 | 13.0 | 87 |

[1] Isobutyronitrile.
[2] Cumene hydroperoxide.

The synergistic effect of the combination of individual components is clearly demonstrated by the increased yield of white, solid polyethylene.

*Example 2*

The process of Example 1 was repeated, using ethyl malononitrile as component A, at a temperature of 150°

C. and a pressure of 5000 p. s. i. The results are shown in the following table:

| Catalyst | | | | Polymer Yield, Parts per 100 of Monomer | Polymer Softening Point, °C. |
|---|---|---|---|---|---|
| Component A | Parts | Component B | Parts | | |
| EMN [1] | 0.5 | None | | None | |
| None | | CHP [2] | 0.5 | 5.0 | 97 |
| EMN [1] | 0.5 | CHP [2] | 0.5 | 14.2 | 93 |

[1] Ethyl malononitrile.
[2] Cumene hydroperoxide.

The yield of polymer is again substantially greater using the two-component catalyst system than with the component B alone. As in Example 1, solid white polymer was obtained using the inductive catalyst system.

Example 3

The process of Example 1 was repeated using isopropyl benzoate as component A.

| Catalyst | | | | Polymer Yield, Parts per 100 of Monomer | Polymer Softening Point, °C. |
|---|---|---|---|---|---|
| Component A | Parts | Component B | Parts | | |
| IPB [1] | 0.5 | None | | None | |
| None | | CHP [2] | 0.5 | 3.6 | 91 |
| IPB [1] | 0.5 | CHP [2] | 0.5 | 10.2 | 96 |

[1] Isopropyl benzoate.
[2] Cumene hydroperoxide.

Example 4

Ethylene was polymerized at 200° C. using tetraethyl lead as component B and isobutyronitrile as component A. As in the previous examples, the component A, alone, did not initiate ethylene polymerization.

| Catalyst | | | | Polymer Yield, Parts per 100 of Monomer | Polymer Softening Point, °C. |
|---|---|---|---|---|---|
| Component A | Parts | Component B | Parts | | |
| None | | TEL [2] | 0.25 | 22 | Solid but tacky. |
| IBN [1] | 0.25 | TEL [2] | 0.25 | 38 | Do. |

[1] Isobutyronitrile.
[2] Tetraethyl lead.

Even under these conditions where 22 percent of polyethylene is formed by component B, the addition of component A significantly increases the yield.

Example 5

The process of Example 1 was repeated using benzoyl peroxide as component B polymerizing at 100° C. and 5000 p. s. i. pressure.

| Catalyst | | | | Polymer Yield, Parts per 100 of Monomer | Polymer Softening Point, °C. |
|---|---|---|---|---|---|
| Component A | Parts | Component B | Parts | | |
| None | | BP [1] | 0.5 | 5.0 | 115 |
| IBN [2] | 0.5 | BP [1] | 0.5 | 9.8 | 117 |

[1] Benzoyl peroxide.
[2] Isobutyronitrile.

Example 6

The process of Example 6 was repeated using isopropyl isobutyrate as component A.

| Catalyst | | | | Polymer Yield, Parts per 100 of Monomer | Polymer Softening Point, °C. |
|---|---|---|---|---|---|
| Component A | Parts | Component B | Parts | | |
| None | | BP [1] | 0.5 | 5.0 | 115 |
| IPIB [2] | 0.5 | BP [1] | 0.5 | 11.2 | 115 |

[1] Benzoyl peroxide.
[2] Isopropyl isobutyrate.

Example 7

The process of Example 1 was repeated using t-butyl hydroperoxide as component B.

| Catalyst | | | | Polymer Yield, Parts per 100 of Monomer | Polymer Softening Point, °C. |
|---|---|---|---|---|---|
| Component A | Parts | Component B | Parts | | |
| None | | TBHP [1] | 0.5 | 8.3 | 94 |
| IBN [2] | 0.5 | TBHP [1] | 0.5 | 14.8 | 91 |

[1] t-Butyl hydroperoxide.
[2] Isobutyronitrile.

Example 8

The process of Example 1 was repeated using 0.25 percent of each component of the inductive catalyst.

| Catalyst | | | | Polymer Yield, Parts per 100 of Monomer | Polymer Softening Point, °C. |
|---|---|---|---|---|---|
| Component A | Parts | Component B | Parts | | |
| None | | CHP [1] | 0.25 | 4.3 | 94 |
| IBN [2] | 0.25 | CHP [1] | 0.25 | 7.8 | 101 |

[1] Cumene hydroperoxide.
[2] Isobutyronitrile.

Example 9

Ethylene was polymerized at 125° C. using an inductive catalyst system comprising ethyl malononitrile and cumene hydroperoxide. Repeat runs were made with water and benzene added to the reactors.

| Catalyst | | | | Additive | Parts | Polymer Yield, Parts per 100 of Monomer | Polymer Softening Point, °C |
|---|---|---|---|---|---|---|---|
| Component A | Parts | Component B | Parts | | | | |
| EMN [1] | 0.5 | CHP [2] | 0.5 | None | | 14.5 | 88 |
| EMN [1] | 0.5 | CHP [2] | 0.5 | Water | 20 | 13.5 | 103 |
| EMN [1] | 0.5 | CHP [2] | 0.5 | Benzene | 15 | 10.3 | 89 |

[1] Ethylmalononitrile.
[2] Cumene hydroperoxide.

The addition of either water or benzene has a small effect on polymer yield. The polymer softening point is significantly increased by the addition of water.

As mentioned previously, the temperature range over which these catalytic systems are operable is very broad. A selection of components can be made such that satisfactory conversions can be obtained in the range from about 50° C. to about 250° C. For many purposes reaction temperatures of 100° C. to 175° C. are desirable, and many catalyst systems of the type claimed can be designed which will function in this range. It is desirable to carry out the ethylene polymerization under a pressure of at least 1000 p. s. i. with the preferred pressure range being 4000 p. s. i. to 10,000 p. s. i. The concentrations of the components of the catalyst system can be varied from 0.05 percent to 2.5 percent or more of the weight of the polymerizable compounds present. It is preferable, but not necessary, that component A be present in amounts at least equivalent to the component B present.

While the examples cited were all carried out as batch processes, inductive catalysis would be readily usable in the continuous polymerization of ethylene. The application of the process to continuous polymerization will be obvious to those skilled in the art.

While there are above disclosed but a limited number of embodiments of the process and product of the present invention it is possible to provide still other embodiments without departing from the inventive concept herein disclosed, and it is therefore desired that only such limitations be imposed on the appended claims as are stated therein or required by the prior art.

The invention claimed is:

1. In polymerizing ethylene the process which comprises maintaining ethylene at a pressure of at least 1000 p. s. i. until polymerization occurs in contact with a 2-component catalyst composition at a temperature of about 50°–250° C. and in the proportion of about 0.05%–2.5% of each component on the weight of the monomer, the catalyst composition comprising (1) an agent selected from the group consisting of organic peroxides and tetraethyl lead and (2) a substituted methane of the type formula

in which X is a polar component selected from the group consisting of —CN, —COOH, —COOR₃, —OOCR₃, and

R₁ represents a $C_1$–$C_2$ alkyl, R₃ a monovalent hydrocarbon radical containing not more than 6 carbon atoms, and R₂ a component selected from the group consisting of R₁ and X, the said substituted methane remaining uncombined in the final polymer.

2. The process of claim 1 in which the said agent is an organic peroxide.

3. The process of claim 1 in which the said agent is cumene hydroperoxide.

4. The process of claim 1 in which the said polar component is isobutyronitrile.

5. The process of claim 1 in which the said polar component is ethyl malononitrile.

6. The process of claim 1 in which the said polar component is isopropyl benzoate.

References Cited in the file of this patent

UNITED STATES PATENTS

| | | |
|---|---|---|
| 2,402,137 | Hanford | June 18, 1946 |
| 2,566,538 | Schmerling | Sept. 4, 1951 |
| 2,568,902 | Thompson | Sept. 25, 1951 |